(12) United States Patent
Harvey (10) Patent No.: US 11,293,523 B2
(45) Date of Patent: Apr. 5, 2022

(54) GEARBOX ASSEMBLY AND WORM SHAFT ASSEMBLY THEREFORE STEERING COLUMN ASSEMBLY

(71) Applicant: ZF Automotive UK Limited, Solihull (GB)

(72) Inventor: Phil Harvey, Birmingham (GB)

(73) Assignee: ZF Automotive UK Limited

( * ) Notice: Subject to any disclaimer, the term of this patent is extended or adjusted under 35 U.S.C. 154(b) by 0 days.

(21) Appl. No.: 17/031,554

(22) Filed: Sep. 24, 2020

(65) Prior Publication Data

US 2021/0088113 A1 Mar. 25, 2021

(30) Foreign Application Priority Data

Sep. 25, 2019 (GB) ..................... 1913834

(51) Int. Cl.

| F16H 1/16 | (2006.01) |
|---|---|
| B62D 3/04 | (2006.01) |
| F16H 57/021 | (2012.01) |
| F16H 57/039 | (2012.01) |
| F16H 1/24 | (2006.01) |
| F16D 3/12 | (2006.01) |
| F16D 1/108 | (2006.01) |
| F16D 1/10 | (2006.01) |
| B62D 5/04 | (2006.01) |
| F16H 57/02 | (2012.01) |

(52) U.S. Cl.
CPC ................. *F16H 1/16* (2013.01); *B62D 3/04* (2013.01); *F16D 1/108* (2013.01); *F16D 3/12* (2013.01); *F16H 1/24* (2013.01); *F16H 57/021* (2013.01); *F16H 57/039* (2013.01); *B62D 5/04* (2013.01); *F16D 2001/103* (2013.01); *F16H 2057/0213* (2013.01); *F16H 2057/02082* (2013.01)

(58) Field of Classification Search
CPC . F16H 1/16; F16H 1/24; F16H 57/021; F16H 57/039; F16H 2057/0213; B62D 3/04; B62D 5/0409; F16D 1/108; F16D 3/12; F16D 2001/103
See application file for complete search history.

(56) References Cited

U.S. PATENT DOCUMENTS

| 6,550,567 B2 * | 4/2003 | Murakami | ............ F16F 1/3828 |
|---|---|---|---|
| | | | 180/444 |
| 9,193,384 B1 | 11/2015 | Murakami | |
| 2007/0163374 A1 * | 7/2007 | Yamazaki | ............... F16C 27/04 |
| | | | 74/409 |

FOREIGN PATENT DOCUMENTS

| KR | 1020180978050 A | 7/2018 |
|---|---|---|
| WO | 201812444 A1 | 1/2018 |

* cited by examiner

*Primary Examiner* — Thomas C Diaz
(74) *Attorney, Agent, or Firm* — Robert James Harwood (57) ABSTRACT

A gearbox assembly includes a housing, a first shaft assembly having a worm gear and supported relative to the housing by a first bearing assembly, and a second shaft assembly including a wheel gear which is also supported relative to the housing by a second bearing assembly, the wheel gear engaging with the worm of the worm gear to permit the transfer of torque between the two shaft assemblies, wherein the first shaft assembly includes an elongate shaft carrying the worm gear, and a separate dog drive mechanism secured to one end of the elongate shaft by the first bearing such that in use torque is transferred between the elongate shaft and the dog drive mechanism.

10 Claims, 13 Drawing Sheets

GEARBOX ASSEMBLY AND WORM SHAFT ASSEMBLY THEREFORE STEERING COLUMN ASSEMBLY

CROSS-REFERENCE TO RELATED APPLICATION

This application claims priority to UK Patent Application No. 1913834.6 filed Sep. 25, 2019, the disclosure of which is incorporated herein by reference in its entirety.

TECHNICAL FIELD

This disclosure relates to improvements in gearbox assemblies, in particular to a gearbox assembly for use in an electric power steering assembly. It also relates to wormshaft assemblies for incorporation in a gearbox and to electric power steering systems that include a gearbox assembly.

BACKGROUND

It is known to provide a gearbox assembly of the kind having a housing that locates and protects a worm and wheel gear assembly. The gear assembly comprises a first shaft assembly comprising a worm gear, in the form of a helical screw that extends along a length of the shaft, that is supported relative to the housing by at least one annular bearing assembly, and a second shaft assembly comprising carrying a wheel gear which is also supported relative to the housing by at least one bearing assembly. The two shafts are offset axially and are arranged perpendicular to each other so that teeth on the perimeter of the wheel gear engages with the worm of the worm gear. Rotation of the wheel gear will cause rotation of the worm gear and vice versa. This permits the transfer of torque between the two shafts. One shaft may define the input to the gearbox assembly and the other the output.

Worm and wheel gear assemblies are especially suitable for applications where a simple compact mechanism with a high gear ratio is required. Through the appropriate choice of gear tooth design a worm and wheel gear assembly can provide a low backlash in both transmission directions along with low friction. These are important characteristics in an electric power steering assembly where a motor applies an assistance torque through a gearbox to a part of a steering mechanism to help the driver to turn the steering wheel. Any backlash would give an undesirable feel to the driver through the steering wheel. The 90 degree offset between the input and output allows for a convenient positioning of a drive motor alongside a steering shaft.

Figure 3:
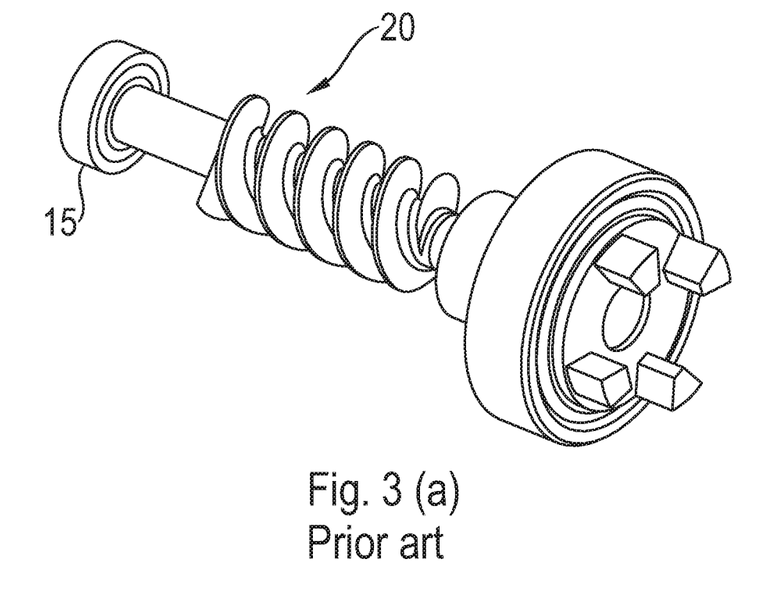
Figures 4A, 4B, 5A, 5B:
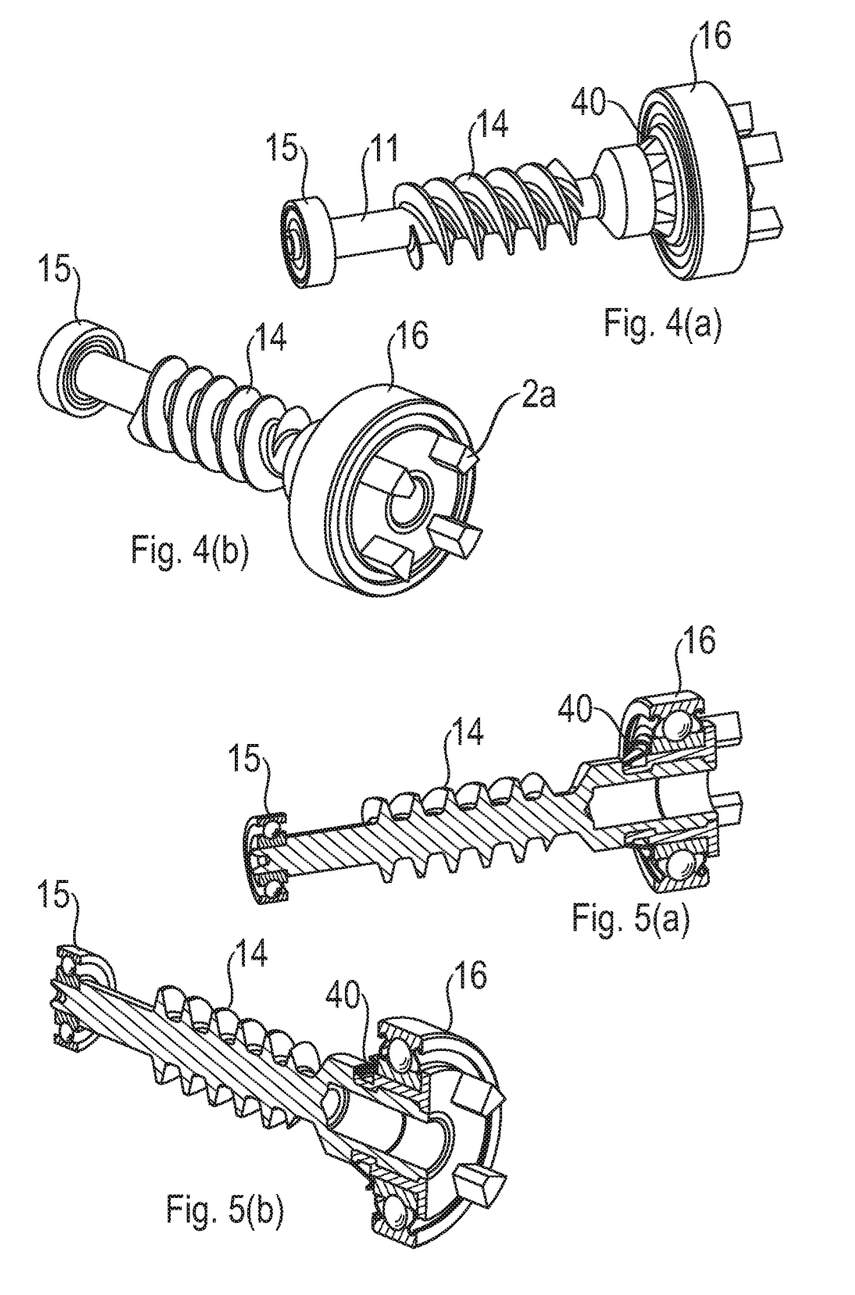

To connect an electric drive motor to the input shaft of the gearbox assembly it is known to provide a dog drive mechanism as part of the worm shaft. This may include a set of dog teeth that engage a similar dog drive mechanism fixed to the motor. A prior art wormshaft that has a set of 4 dog teeth on one end is shown in FIG. 3. As can be seen the dog teeth are mounted on a radially protruding ring shaped carrier that has a relatively large diameter compared with the worm shaft. The provision of dog teeth to transfer drive from one rotating component to another with zero possibility of slip is well known in the art of gearbox design and in particular in the field of gearboxes for electric power steering systems.

The applicant has appreciated that the manufacture of such a shaft from a stock metal bar is very wasteful of material due to the large radius of the ring shaped carrier. This makes the part relatively expensive to produce and, in the case of a unitary metal part, makes the shaft relatively heavy.

SUMMARY

According to a first embodiment of the present disclosure provides a gearbox assembly comprising a gearbox assembly comprising a housing, a first shaft assembly comprising a worm gear and supported relative to the housing by a first bearing assembly, and a second shaft assembly comprising a wheel gear which is also supported relative to the housing by a second bearing assembly, the wheel gear engaging with the worm of the worm gear to permit the transfer of torque between the two shaft assemblies, characterized in that the first shaft assembly comprises an elongate shaft carrying the worm gear, and a separate dog drive mechanism secured to one end of the elongate shaft by the first bearing such that in use torque is transferred between the elongate shaft and the dog drive mechanism.

The dog drive mechanism may comprise two or more dog teeth offset radially from the axis of the elongate shaft for engaging corresponding dog teeth of an external drive mechanism. This external mechanism may be a complimentary dog drive mechanism fixed to an output shaft of an electric motor, the dogs of the two dog drive mechanisms interlocking to transfer rotary motion of the motor to the first shaft assembly.

The first shaft assembly may include a connecting means for securing an elongate shaft of the first shaft assembly to the dog drive mechanism which includes the first bearing assembly. The connecting means may further comprise a biasing mechanism that locates the first bearing assembly around a portion of the dog drive mechanism and applies an axial thrust load through the bearing assembly onto the dog drive mechanism. The connecting means may be separate from the dog drive mechanism and the elongate shaft and may take the form of a collar. Alternatively, the connecting means may be an integral part of the dog drive mechanism which interacts with a feature on the elongate shaft.

The dog drive mechanism may therefore be a snap fit onto the elongate shaft, and the bearing assembly a snap fit onto the outside of the dog drive mechanism with the bearing assembly when in place preventing the dog drive mechanism from being unsnapped from the elongate shaft, locking it in place. The snap fit may be achieved by making a part of the dog drive mechanism resilient.

The dog drive mechanism may include a fixing portion that fits around an end part of the elongate shaft, the fixing portion including inwardly facing splines that engage corresponding outward facing splines provided on the end of the elongate shaft. This may be separate from the connecting means where provided.

The fixing portion may define a cylindrical portion of the dog drive having an inner diameter that substantially matches an outer diameter of the elongate shaft.

The first bearing assembly may comprise an annular bearing assembly having an annular inner race, an annular outer race and bearing elements located between the two races, in which the inner race is a press or interference fit onto an outer surface of the cylindrical portion of the dog drive mechanism. This presses the splines of the dog drive mechanism into engagement with those of the shaft, which in turn stops the dog drive mechanism rotating relative to the shaft.

The cylindrical portion may have a continuous wall that extends around the end of the shaft. However, the skilled person will understand that the cylindrical portion could define a discontinuous wall and may include cut-away regions where the surface of the shaft is exposed. For instance, the cylindrical portion may form a set of axially extending elongate fingers spaced around the circumference of the end portion of the elongate shaft and which pass between the first bearing assembly and the end portion of the shaft.

The inner race of the first bearing assembly may abut a shoulder provided on the dog drive mechanism that reacts the thrust load from the bearing assembly.

The biasing means of the connecting means may comprise a crimp ring, or a star washer, or a tapered coil spring that acts between the elongate shaft and the inner race of the bearing assembly to hold the bearing assembly in position around the cylindrical portion of the dog drive mechanism.

Where the biasing means is integrally formed with the dog drive mechanism the fixing portion may include a plurality of axially extending tabs that have splines formed on their inner faces that engage splines on the elongate shaft. These tabs may be spaced around the splined portion of the elongate shaft. The biasing means may comprise at least one further tab that has a raised or hooked portion along its length or at its free end that engages with a feature on the elongate shaft.

The bearing assembly, when in a position of use, may secure the biasing means into engagement with the elongate shaft such that the biasing means prevents axial movement of the dog mechanism relative to the elongate shaft.

The dog drive mechanism may comprise a one-piece component having a radial disc shaped part at one end from which two or more dog teeth project from one face and a plurality of elongate resilient tabs that extend away from the opposite face, at least one of the tabs including an outwardly facing rib at the free end that retains the bearing assembly against the disc shaped part and an inwardly facing tang that engages with a recess in the elongate shaft. This resilient tab and the rib and tang may form the connecting means of the assembly.

The disc shaped part may have a central opening which receives an end portion of the elongate shaft. It may abut a circumferential shoulder formed on the end of the elongate shaft to limit how far the dog drive mechanism can be pushed onto the shaft.

At least one locating tab may be provided that extends away from the same face of the disk as the resilient tabs, the locating tab being provided with one or more splines on an inner face that are complimentary to and engage splines on the elongate shaft. This engagement allows the dog drive mechanism to transfer torque to the elongate shaft. There may be at least two resilient tabs and two locating tabs, the locating tabs and resilient tabs alternating around the circumference of the elongate shaft.

In an alternative to a one-piece component, the dog drive mechanism may comprise two separate half sleeves that fit together to surround the end portion of the elongate shaft and form the cylindrical portion and the shoulder, the two half sleeves being fixed in position on the elongate shaft by the first bearing assembly and the biasing means.

The dog drive mechanism may include biasing means that engages a recess in outer circumferential surface of the end of the elongate shaft to prevent the half sleeve moving axially relative to the elongate shaft. The first bearing assembly holds the engagement portion in this recess and prevents it from being popped out radially when under load. The recess may comprise a groove which may extend around the full circumference of the shaft.

In an alternative, the shaft may carry a radial protrusion that projects into a recess in the inner surface of the dog drive mechanism that engages the shaft to provide an axial retention function. The radial protrusion may comprise an annular rib that is formed on the end portion of the elongate shaft.

The first shaft assembly may comprise an input to the gearbox assembly and the second shaft assembly may comprise an output of the gearbox assembly. The elongate shaft may comprise a metal component or metal alloy. The dog mechanism may comprise a moulded plastic component or an additive manufactured (AM) part.

According to a second aspect the disclosure provides a wormshaft assembly for a worm and wheel type gearbox assembly, the wormshaft assembly comprising an elongate shaft carrying a worm gear, and a separate dog drive mechanism secured to one end of the elongate shaft, in which the elongate shaft and separate dog drive mechanism are fixed together by a bearing assembly that prevents relative axial and rotational movement between them such that in use torque is transferred between the elongate shaft and the dog drive.

BRIEF DESCRIPTION OF THE DRAWINGS

There will now be described, by way of example only, several embodiments of the present disclosure with reference to and as illustrated in the accompanying drawings of which:

FIG. 3 (a) is a first perspective view of a prior art one-piece metal wormshaft assembly for a worm and wheel gearbox;

FIG. 3 (b) is a second perspective view of a prior art one-piece metal wormshaft assembly for a worm and wheel gearbox;

FIG. 4 (a) is a first perspective view of a first embodiment of a wormshaft assembly of a gearbox assembly in accordance with the present disclosure;

FIG. 4 (b) is a second perspective view of a first embodiment of a wormshaft assembly of a gearbox assembly in accordance with the present disclosure;

FIG. 5 (a) is a first cut away view corresponding to FIG. 4(a);

FIG. 5 (b) is a second cut away view corresponding to FIG. 4(b);

FIG. 7 (a) is a perspective view of the elongate shaft prior to assembly in a gearbox assembly;

FIG. 7 (b) is a corresponding cutaway view of the elongate shaft prior to assembly in a gearbox assembly;

FIG. 8 (a) is a first perspective view of one of a pair of half shells of the dog drive mechanism;

FIG. 8 (b) is a second perspective view of one of a pair of half shells of the dog drive mechanism;

FIG. 8 (c) is a cut away view of the half shell;

FIG. 9 (a) is a first view of a crimp washer of the assembly of the first embodiment;

FIG. 9 (b) is a second view of a crimp washer of the assembly of the first embodiment;

FIG. 9 (c) is a third view of a crimp washer of the assembly of the first embodiment;

FIG. 10 (a) illustrates a first main step carried out for assembly of the wormshaft assembly of the first embodiment;

FIG. 10 (b) illustrates a second main step carried out for assembly of the wormshaft assembly of the first embodiment;

FIG. 10 (c) illustrates a third main step carried out for assembly of the wormshaft assembly of the first embodiment;

FIG. 10 (d) illustrates a fourth main step carried out for assembly of the wormshaft assembly of the first embodiment;

FIG. 10 (e) illustrates a fifth main step carried out for assembly of the wormshaft assembly of the first embodiment;

FIG. 11 (a) illustrates a first view of a second embodiment of a wormshaft assembly once assembled and during assembly;

FIG. 11 (b) illustrates a second view of a second embodiment of a wormshaft assembly once assembled and during assembly;

FIG. 13 (a) illustrates a first view of a third embodiment of a wormshaft assembly once assembled and during assembly;

FIG. 13 (b) illustrates a second view of a third embodiment of a wormshaft assembly once assembled and during assembly;

FIG. 16 (a) is a first perspective view of the dog drive mechanism of FIG. 15 removed from the shaft to highlight the internal splines;

FIG. 16 (b) is a second perspective view of the dog drive mechanism of FIG. 15 (b) removed from the shaft to highlight the internal splines.

DETAILED DESCRIPTION

Figure 1:
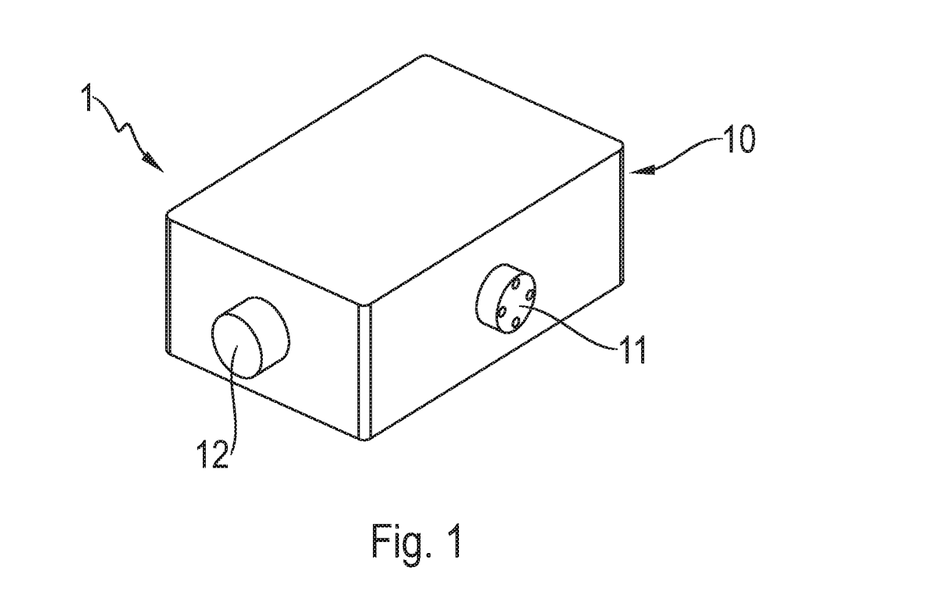
FIG. 1 is a perspective view of a worm and wheel gearbox assembly housing.

As shown in FIG. 1, a gearbox assembly 1 comprises a housing 10 that houses a gear assembly, with a drive mechanism fixed to an end of an input shaft 11 of the gear assembly protruding from one face of the housing and an end of an output shaft 12 of the gear assembly protruding from the other at 90 degrees to the input shaft.

Figure 2:
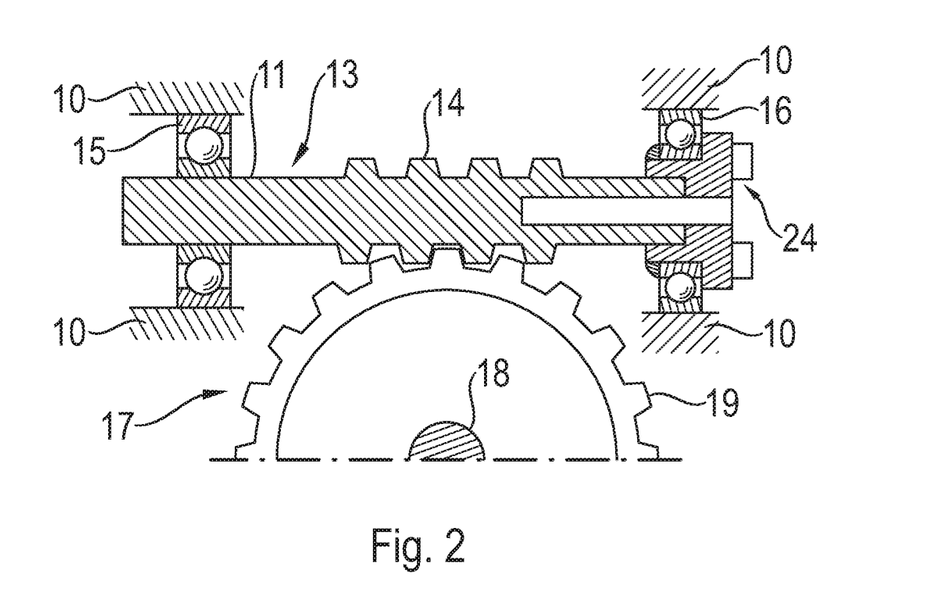
FIG. 2 is a cross sectional view of a generalized gear assembly located within the housing.

FIG. 2 shows the internal features of the gearbox assembly 1 in cross section. A first shaft assembly 13 comprises an elongate input shaft 11 that carries a worm gear 14. The elongate shaft 11 is supported relative to the housing by two bearing assemblies 15, 16, each located towards an opposing end of the shaft 11. The bearing assemblies 15, 16 are retained in seats formed in the inner walls of the housing. Each bearing assembly comprises an annular set of bearings located between an annular inner race and an annular outer race.

A second shaft assembly 17 comprises a second shaft 18 that carries a wheel gear 19. This second shaft is also supported relative to the housing by bearing assemblies (not shown) at each end that are located in seats in the inner walls of the housing. The axis of rotation of the second shaft 18 is offset from, and perpendicular, to the axis of rotation of the first shaft 11.

Teeth of the wheel gear 19 engage with the worm gear 14 to permit the transfer of torque between the two shafts.

Figure 7A:
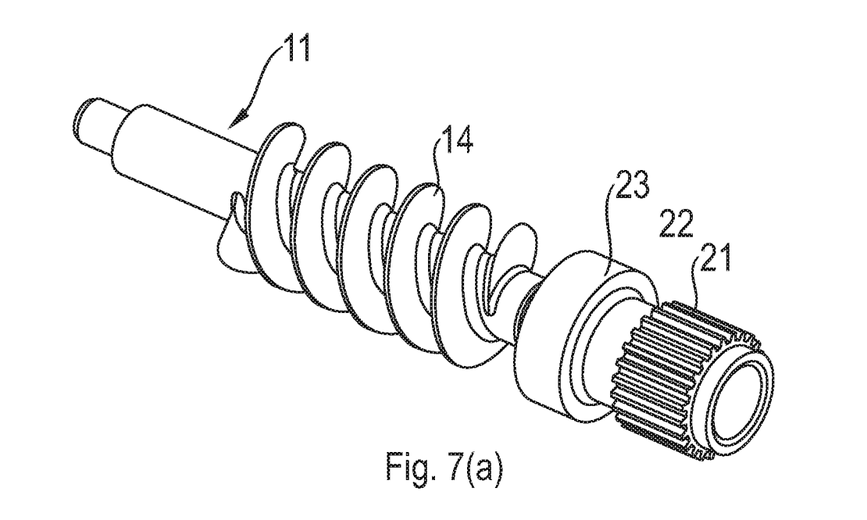
Figure 7B:
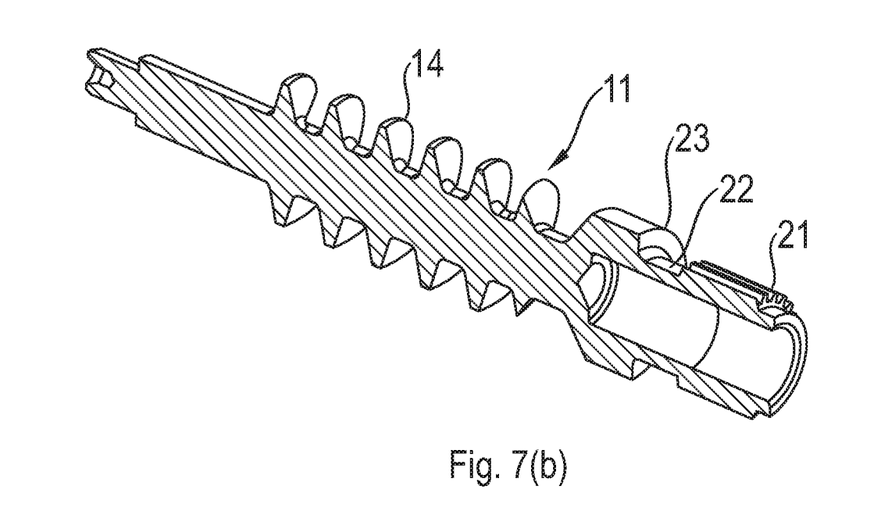
Figure 8A:
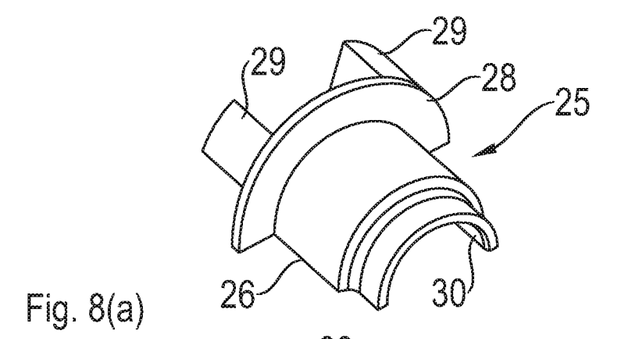
Figure 8B:
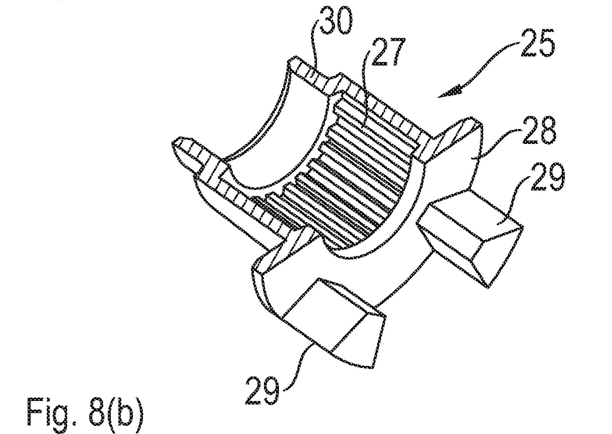
Figure 8C:
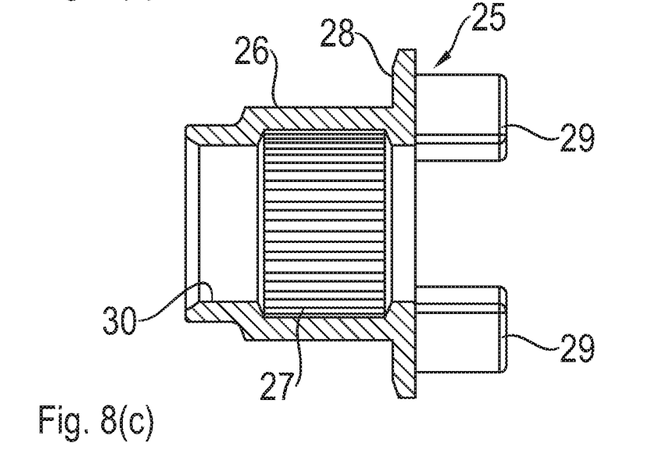

The first shaft 11 is shown with all other components removed in FIG. 7 of the drawings and in cut away in FIG. 8. It comprises an elongate metal shaft, having the worm gear 14 cut into the outer face midway along the shaft. At one end a set of axial splines 21 are formed, and inboard of these splines is an annular groove 22 that terminates with a shoulder 23 that faces the splines across the groove.

At one end of the first shaft assembly is a separate dog drive mechanism 24 which forms the input to the gearbox assembly 1 that can be seen in FIG. 1. This is a molded plastic component which in this embodiment comprises two half shells 25. The elongate first shaft 11 and the separate dog drive mechanism 24 are fixed together to prevent relative axial and rotational movement between them by one of the bearing assemblies 16 such that in use torque is transferred between the elongate shaft 11 and the dog drive mechanism 24. Notably the dog drive mechanism has a larger diameter than the elongate shaft.

The two half shells 25 of the plastic dog drive mechanism are identical and one half shell is shown in detail in FIGS. 8(a) to (c). Each shell has a part cylindrical portion 26 which includes a set of inwardly extending splines 27, and a part disc shaped shoulder portion 28 that extends radially outwards from an end face of the part cylindrical portion 26. This defines two faces, one facing the part cylindrical shaped portion and defining a shoulder, and the other facing away from the part cylindrical shaped portion 26 which carries two dog teeth 29. When the two half shells 25 are placed together onto the end of the elongate shaft 11 they form a full cylinder that surrounds the splined portion of the shaft and a radially extending disc that forms the shoulder.

As shown the two half shells are identical but that is not essential to the disclosure. The two half shells 25 can be placed around the end of the elongate shaft 11 so that the splines 27 of the half shells engage the corresponding splines 21 on the elongate shaft 11. An inwardly extending ring 39 on the end of the cylindrical portion furthest from the shoulder engages into a correspondingly shaped groove in the shaft adjacent the splines. This stops the dog drive mechanism 24 from being pulled axially away from the end of the shaft.

Figure 6:
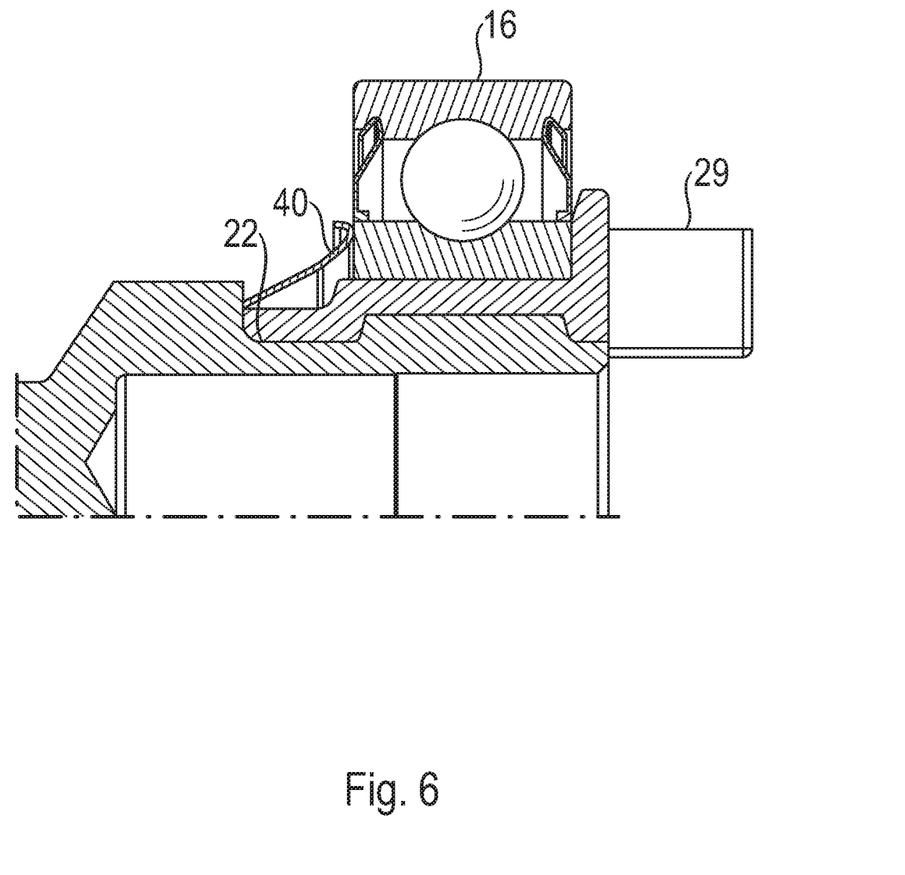
FIG. 6 is an enlarged cross sectional view of a part of the wormshaft assembly of FIGS. 4 and 5 showing the connection of a separate dog drive mechanism to an end of the worm shaft.
Figure 9A:
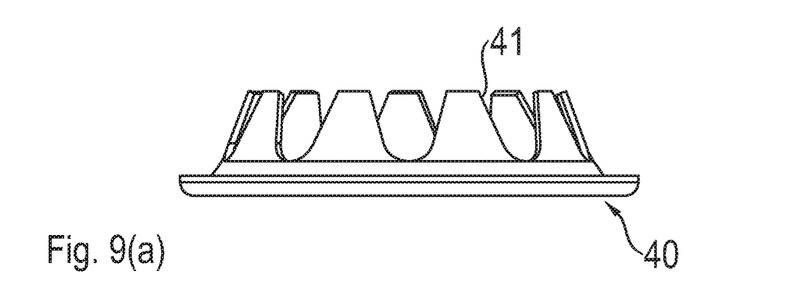
Figure 9B:
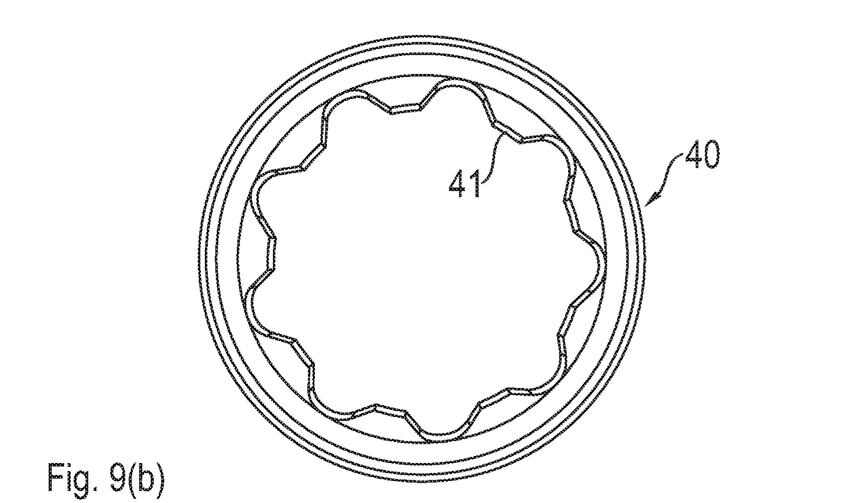
Figure 9C:
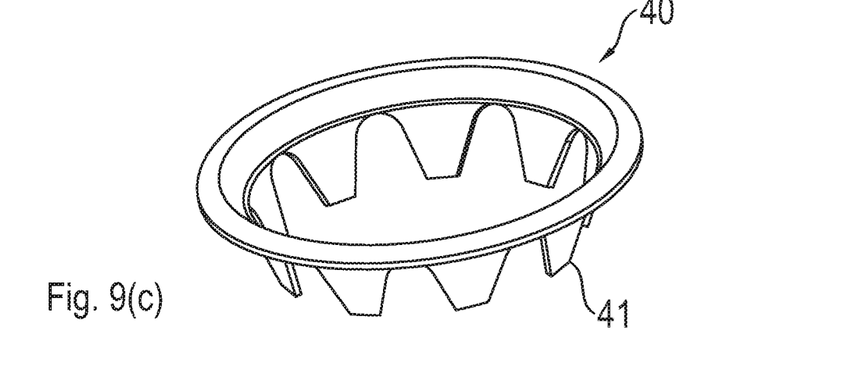

To hold the two half shells 25 together, the annular bearing assembly 16 is located over the cylindrical portion 26, and a crimp ring 40 is located in the groove that contains the inwardly extending ring, resilient fingers 41 of the crimp ring applying a thrust onto the bearing to in turn apply a thrust to the shoulder of the dog drive mechanism. A suitable crimp ring is shown in FIG. 9. The location of the crimp ring 30 is shown best in the cross sectional view of the worm shaft assembly in FIG. 6.

The steps that may be performed during assembly of the worm shaft assembly are shown in FIGS. 10 (a) to (e).

Figure 10A:
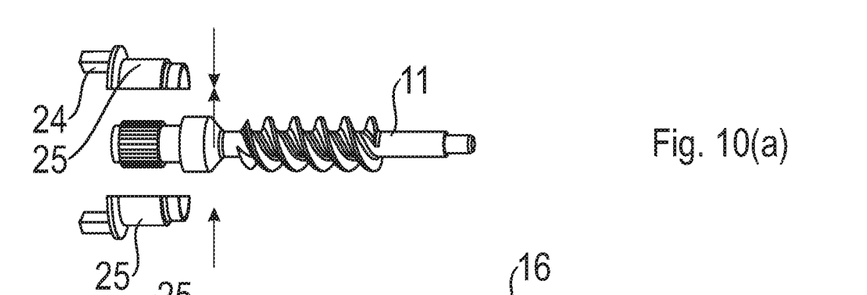

Step A—the two half shells 25 are placed onto the end of the elongate shaft 11 so that the inner splines 27 engage the splines of the elongate shaft 11 and the inward facing ring 30 engages in the groove on the shaft.

Figure 10B:
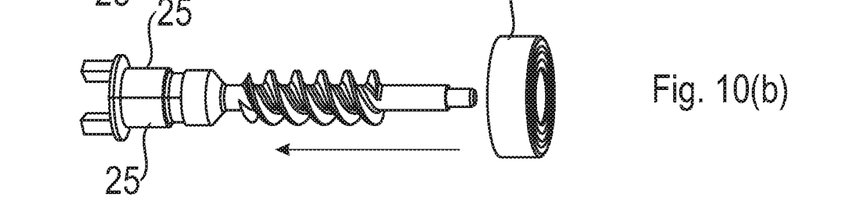

Step B—the annular bearing assembly 16 is pressed onto the shaft 11 from the end furthest from the half shells 25 towards the half shells 25.

Figure 10C:
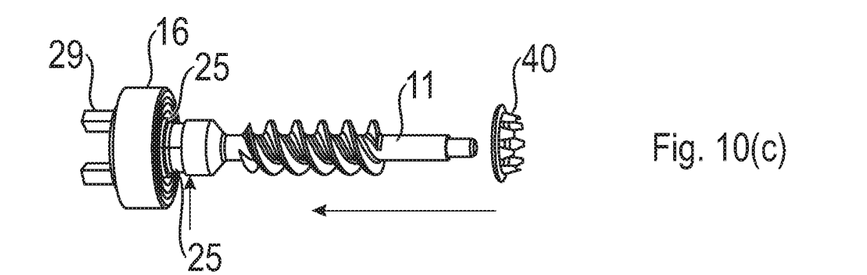

Step C—the bearing assembly 16 is brought to rest abutting the shoulder of the two half shells 25 with an interference fit of the inner race of the bearing assembly with the outer surface of the cylindrical portion 26 of the two half shells 25. This squeezes the plastic splines of the half shells 25 onto the metal splines of the shaft 11.

Figure 10D:
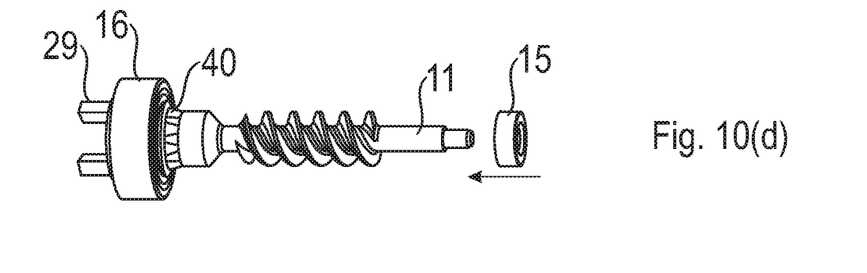
Figure 10E:
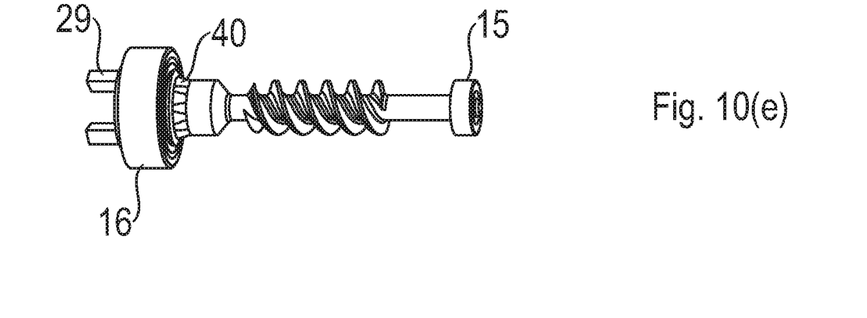

Step D—The crimp ring 40 is threaded onto the shaft 11 from the end furthest from the bearing assembly 16, and finally Step E—the crimp ring 40 is snapped into the groove 22 on the shaft and applies a thrust to the inner race of the bearing assembly 16 that is reacted by the shoulder of the half shells 25.

Figures 11A, 11B:
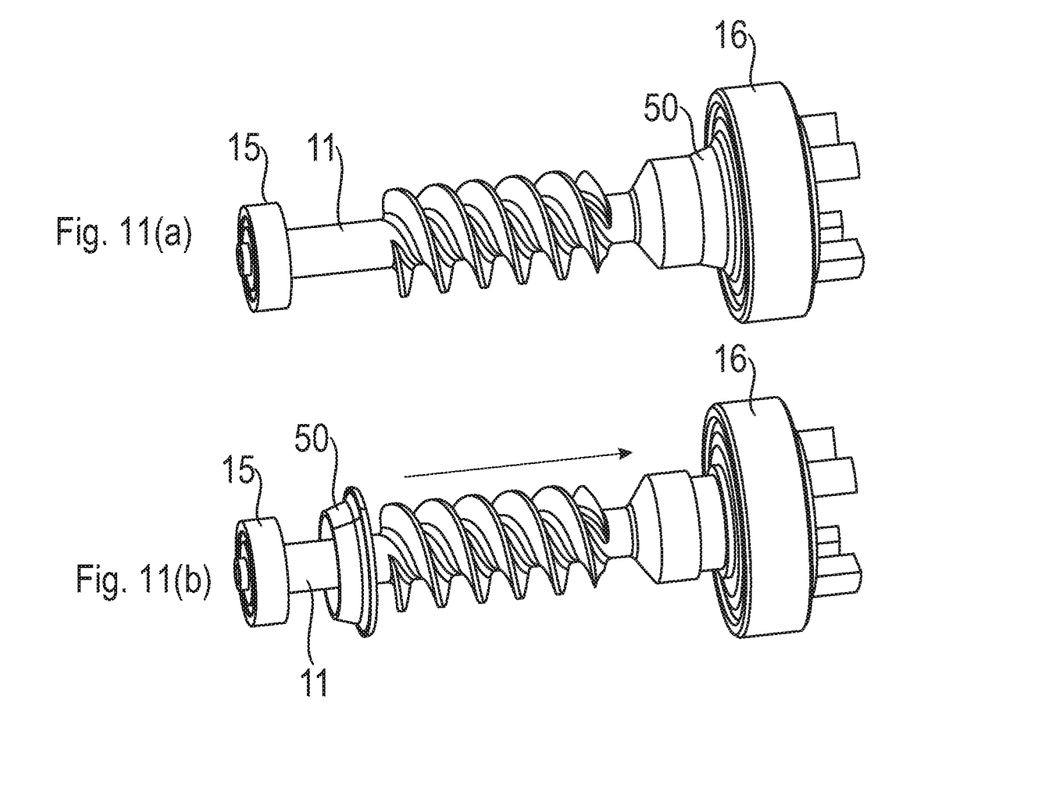
Figure 12:
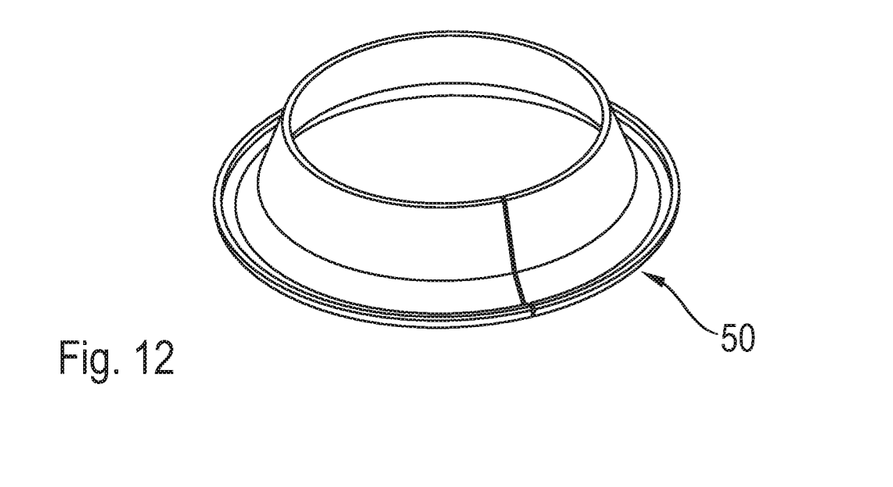
FIG. 12 is a perspective view of the split ring used to retain the dog drive mechanism of the second embodiment.

A second embodiment of the present disclosure is shown in FIGS. 11 and 12. This has the same components as the first embodiment apart from the use of a split ring 50 of steel instead of the crimp ring. This split ring 50 snaps into the groove in the shaft to apply the required thrust to the bearing assembly 16.

Figures 13A, 13B:
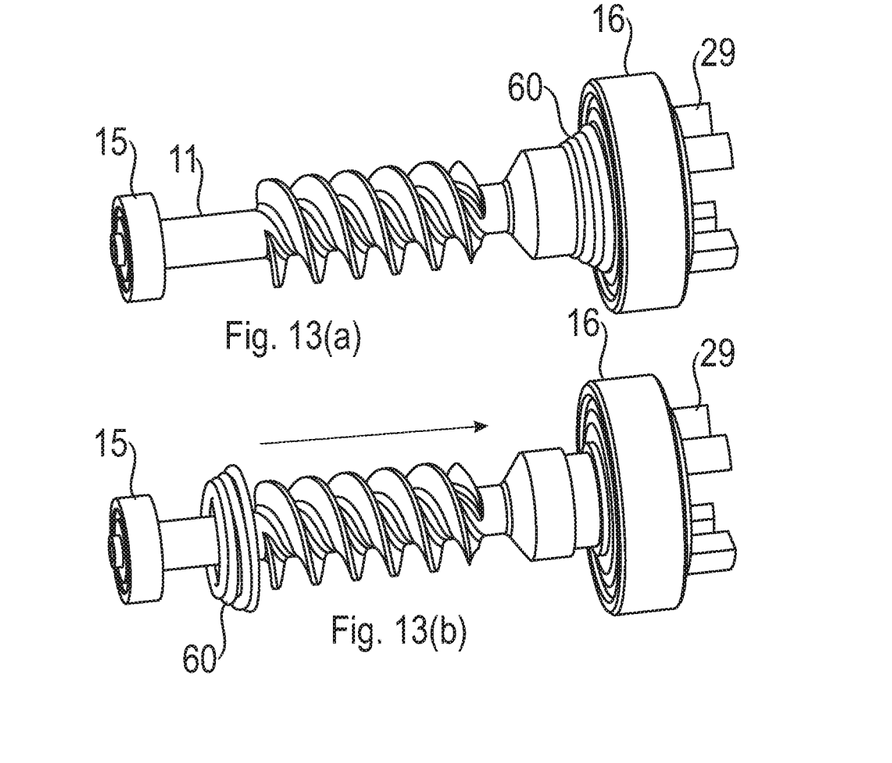
Figure 14:
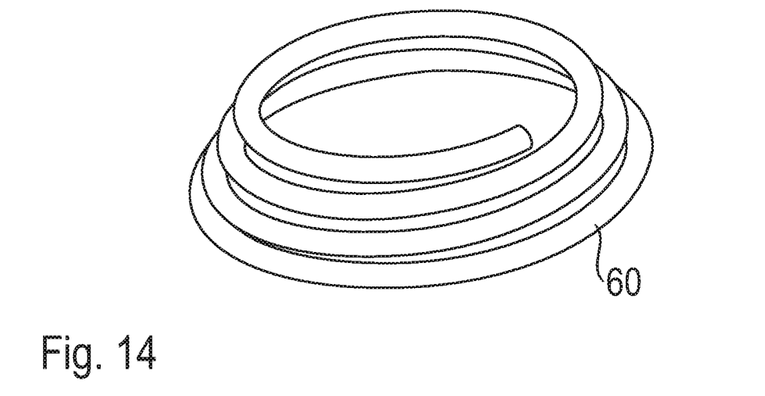
FIG. 14 is a perspective view of the tapered coil spring used to retain the dog drive mechanism of the second embodiment.
Figures 15A, 15B:
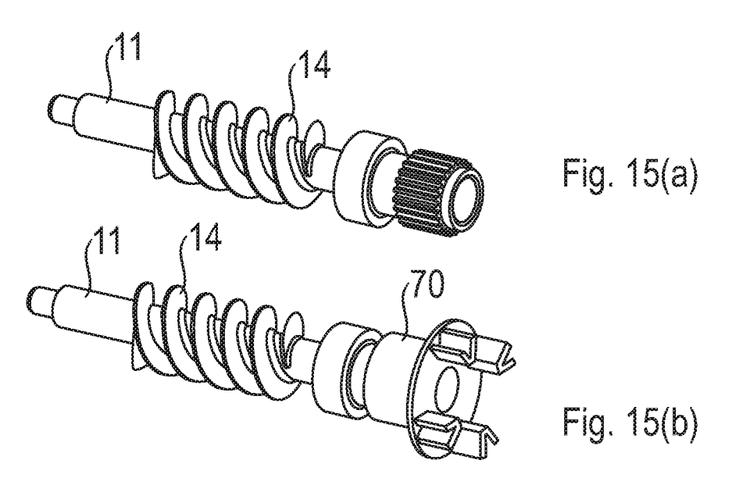
FIG. 15(a) is a view of a further embodiment of a shaft shown in FIG. 15(a)
FIG. 15(b) is a view of another embodiment of the dog drive mechanism.

In another alternative embodiment shown in FIGS. 13 and 14, a tapered coil spring 60 is provided as an alternative to the crimp ring. The smallest coil of the spring snaps into the groove in the shaft, and the largest coil acts on the bearing assembly. The spring is held in compression in this state to generate the required thrust on the bearing assembly.

Figures 16A, 16B:
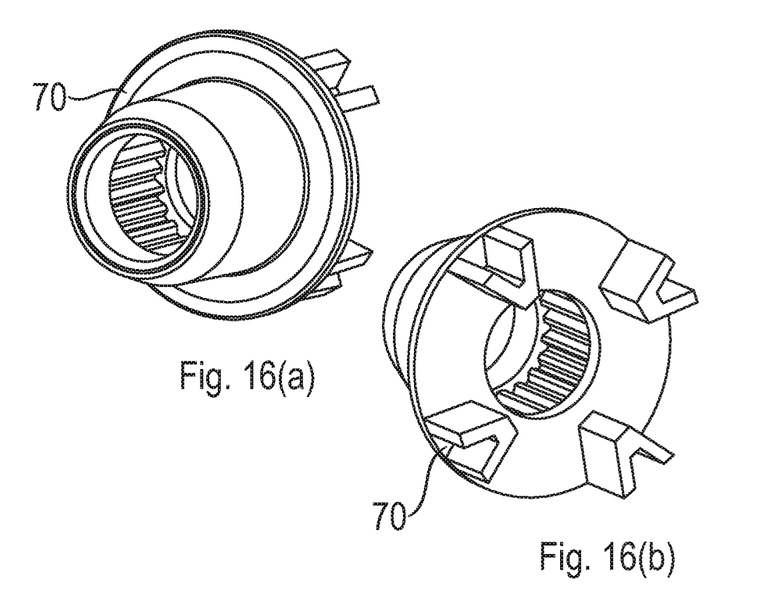

A rather different embodiment is shown in FIG. 16. In this embodiment the shaft 11 is the same as the other embodiments but a single part dog drive mechanism 70 is provided by overmolding a plastic component onto the end of the shaft 11. The shaft may be the same as the previous embodiments. The overmolded dog drive mechanism 70 is similar to the two half shells in that it engages the groove 22 in the shaft 11 and the splines, as well as having a radial ring the forms a support face for the dog teeth.

In the overmolded arrangement the bearing assembly 16 is pressed onto the outer face of a cylindrical portion of the overmolding 70 in the same way as the two half shells, and may be held in place by a crimp ring 40, split washer 50 or tapered spring 60 in the same way as the previous embodiments of the disclosure.

Figure 17:
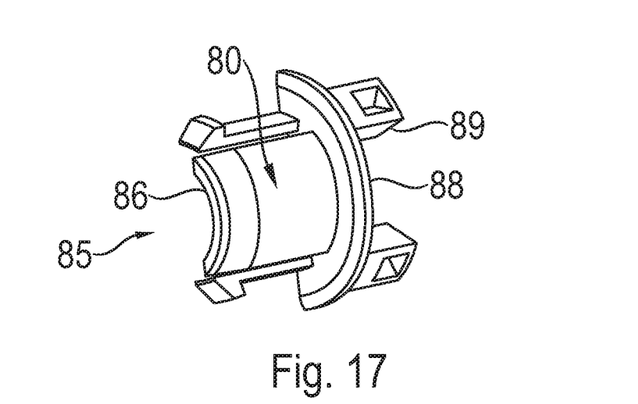
FIG. 17 is a second perspective view of one of a pair of half shells of the dog drive mechanism in a further embodiment of the disclosure.
Figure 18:
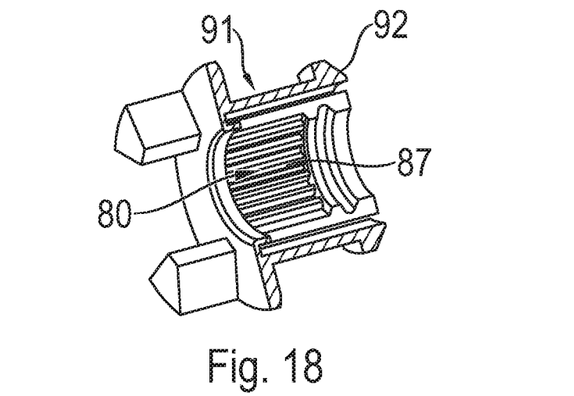
FIG. 18 is a first perspective view of one of a pair of half shells of the dog drive mechanism in a further embodiment of the disclosure.
Figure 19:
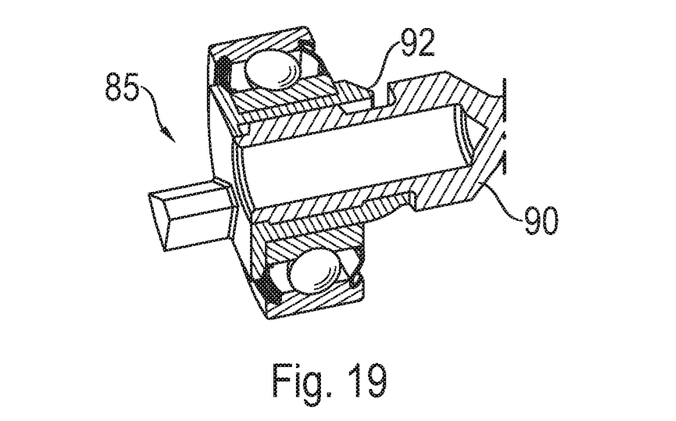
FIG. 19 shows how the two half shells are secured to the elongate shaft by a bearing assembly.

An alternative embodiment is shown in FIGS. 17 and 18 which eliminates the need for a crimp ring by use of resilient features of the dog drive mechanism. Similar to the embodiment of FIG. 8, a dog drive mechanism 80 comprises two half dog shells 85 are provided which together form a dog mechanism. These are secured to an elongate shaft 90 similar to that of the first two embodiments using splines on the inside of the shells that engage with splines on an end of the elongate shaft. A bearing assembly is then press fitted around the shells.

Each shell has an axially extending tab in the form of a major part cylindrical portion 86 defining a tab which includes a set of inwardly extending splines 87, and a part disc shaped shoulder portion 88 that extends radially outwards from an end face of the part cylindrical portion 86. This defines two faces, one facing the tab and defining a shoulder, and the other facing away from the tab which carries two dog teeth 89. When the two half shells 85 are placed together onto the end of the elongate shaft 90 they form a cylinder that surrounds the splined portion of the shaft and a radially extending disc that forms the shoulder.

Each half shell also carries two slimmer tabs 91 that extend along a respective side of the tabs 85. These are resilient and have an outwardly facing hook 92 on one end. The spacing between the hook 92 and the facing surface of the shoulder part 88 is chosen to be slightly smaller than the width of the inner race of the bearing assembly so that bearing assembly snaps into this space by deflecting the slimmer tabs. At the same time this deforms the end of the slimmer tab to form an inward facing tang 93 that is pressed into a groove in the elongate sleeve. The tang cooperates with the shoulder of the disc to prevent axial movement of the half shell relative to the elongate shaft.

Figure 20:
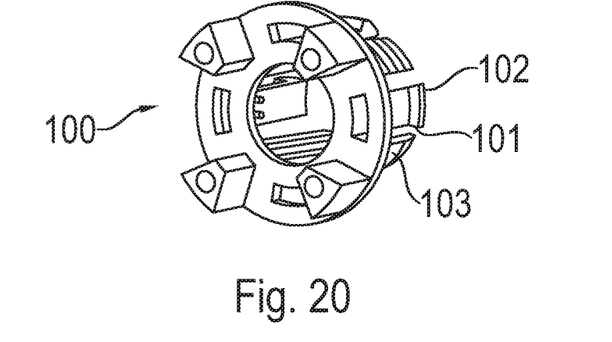
FIG. 20 is a first perspective views of an alternative one-piece dog drive mechanism in a still further embodiment of the disclosure.
Figure 21:
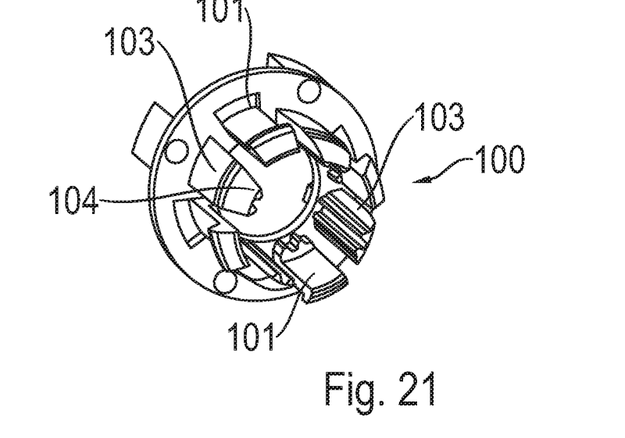
FIG. 21 is a first perspective views of an alternative one-piece dog drive mechanism in a still further embodiment of the disclosure.
Figure 22:
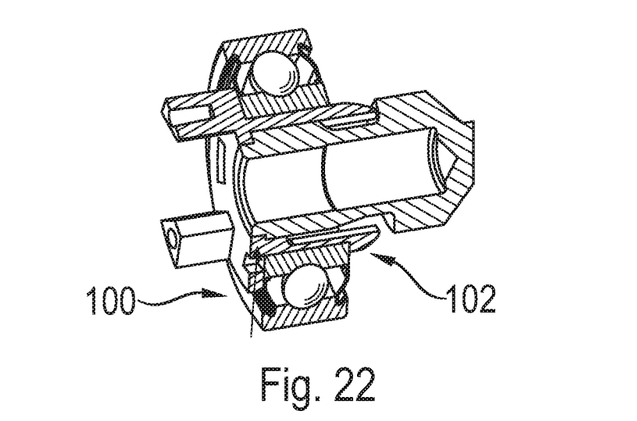
FIG. 22 shows how the one-piece dog drive mechanism is secured to the elongate shaft by a bearing assembly.

FIGS. 20 and 21 illustrate a still further alternative embodiment which also eliminates the need for a crimp ring by use of resilient features of the dog drive mechanism. This is similar to that shown in FIGS. 17 and 18 in function but rather than providing two half shells the dog mechanism is formed as one-piece component 100. Resilient slim tabs 101 that operate in the same manner as that of the tabs on the half shells of FIGS. 17 and 8 with outwardly extending hooks that allow the bearing inner race to snap into place and at the same time apply a radially inward force that squeezes the ends of the tabs into the groove in the elongate shaft. A further set of locating tabs 103 which each have splines 104 on their inner faces engage with splines on the elongate shaft to transfer torque. The shaft and bearing may be identical to that used in the embodiment of FIGS. 17 and 18.

What is claimed is:

1. A gearbox assembly comprising a gearbox assembly comprising:
   a housing;
   a first shaft assembly comprising a worm gear and supported relative to the housing by a first bearing assembly; and
   a second shaft assembly comprising a wheel gear which is also supported relative to the housing by a second bearing assembly, the wheel gear engaging with the worm of the worm gear to permit the transfer of torque between the two shaft assemblies;
   wherein the first shaft assembly comprises an elongate shaft carrying the worm gear, a separate dog drive mechanism, and a connecting means including the first bearing assembly and a biasing member, the biasing member locating the first bearing assembly around a portion of the dog drive mechanism and applying an axial thrust load through the first bearing assembly onto the dog drive mechanism to secure the dog drive mechanism to one end of the elongate shaft such that in use torque is transferred between the elongate shaft and the dog drive mechanism.

2. A gearbox assembly as defined in claim 1 wherein the dog drive mechanism further comprises two or more dog teeth offset radially from the axis of the elongate shaft for engaging corresponding dog teeth of an external drive mechanism.

3. A gearbox assembly as defined in claim 1 in which the connecting means is a collar that is separate from the dog drive mechanism.

4. A gearbox assembly as defined in claim 1 in which the connecting means is an integral part of the dog drive mechanism which interacts with a feature on the elongate shaft.

5. A gearbox assembly as defined in claim 4 wherein the dog drive mechanism is snap fit onto the elongate shaft, and the first bearing assembly is a snap fit onto the outside of the dog drive mechanism with the first bearing assembly when in place preventing the dog drive mechanism from being unsnapped from the elongate shaft, locking it in place.

6. A gearbox assembly as defined in claim 5 in which the dog drive mechanism includes a fixing portion that fits around an end part of the elongate shaft, the fixing portion including inwardly facing splines that engage corresponding outward facing splines provided on the end of the elongate shaft.

7. A gearbox assembly as defined in claim 6 wherein the dog drive mechanism comprises a one-piece component having a radial disc shaped part at one end from which two or more dog teeth project from one face and a plurality of elongate resilient tabs that extend away from the opposite face, at least one of the tabs including an outwardly facing rib at the free end that retains the first bearing assembly against the disc shaped part and an inwardly facing tang that engages with a recess in the elongate shaft.

8. A gearbox assembly as defined in claim 6 wherein the dog drive mechanism comprises two separate half sleeves that fit together to surround the end portion of the elongate shaft and form a cylindrical portion and a shoulder, the two half sleeves being fixed in position on the elongate shaft by the first bearing assembly and the biasing means.

9. A gearbox assembly as defined in claim 8 wherein the biasing means engages a recess in outer circumferential surface of the end of the elongate shaft to prevent the half sleeve moving axially relative to the elongate shaft.

10. A wormshaft assembly for a worm and wheel type gearbox assembly, the wormshaft assembly comprising:
an elongate shaft carrying a worm gear; and
a separate dog drive mechanism secured to one end of the elongate shaft;
wherein the elongate shaft and separate dog drive mechanism are fixed together by a bearing assembly that prevents relative axial and rotational movement between them such that in use torque is transferred between the elongate shaft and the dog drive.

* * * * *